April 18, 1933. C. S. BRAGG ET AL 1,904,267
BRAKE SYSTEM FOR AUTOMOTIVE VEHICLES
Filed March 28, 1929 3 Sheets-Sheet 2
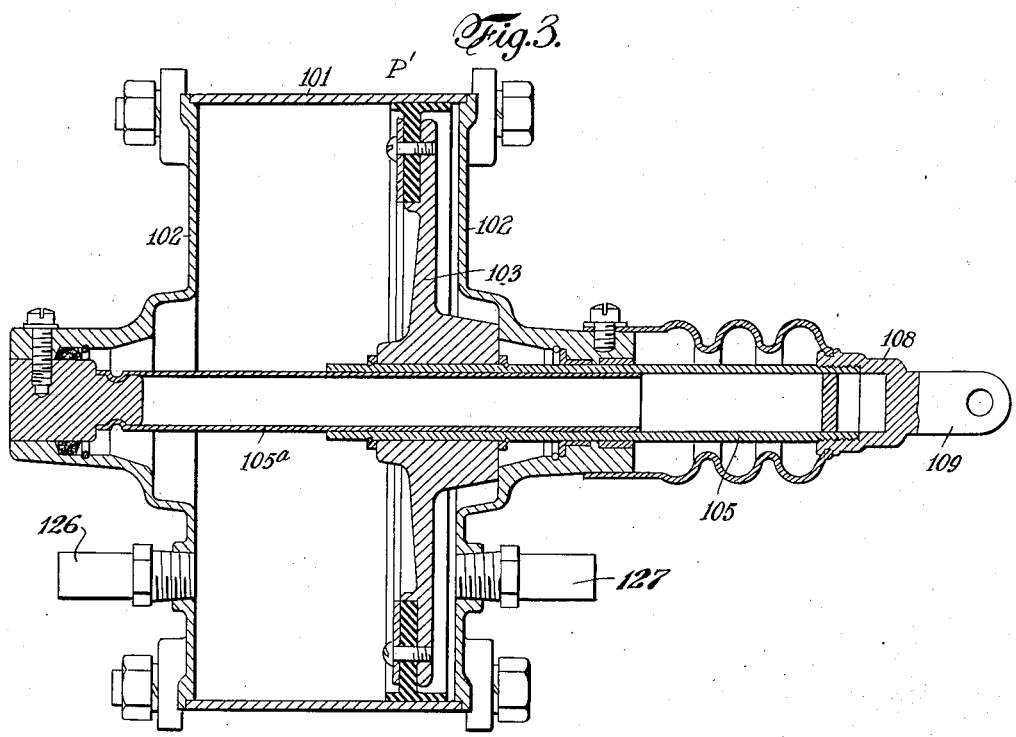
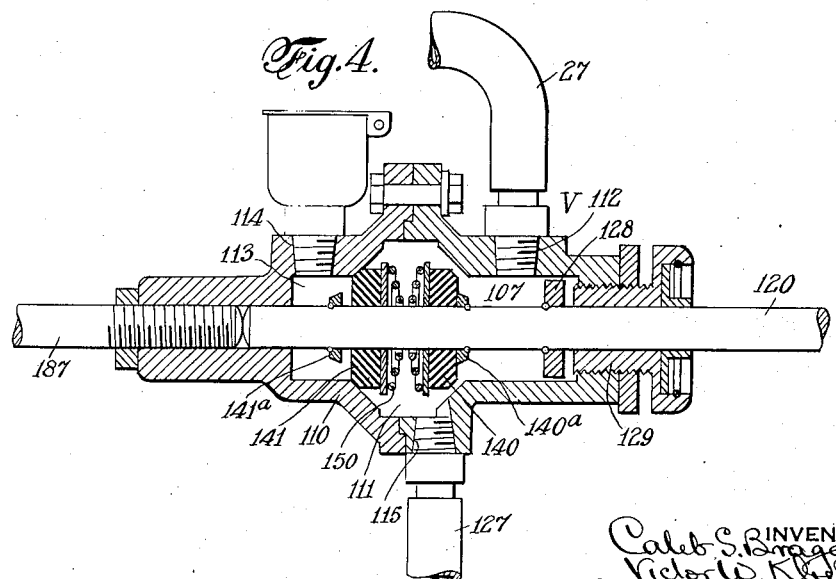

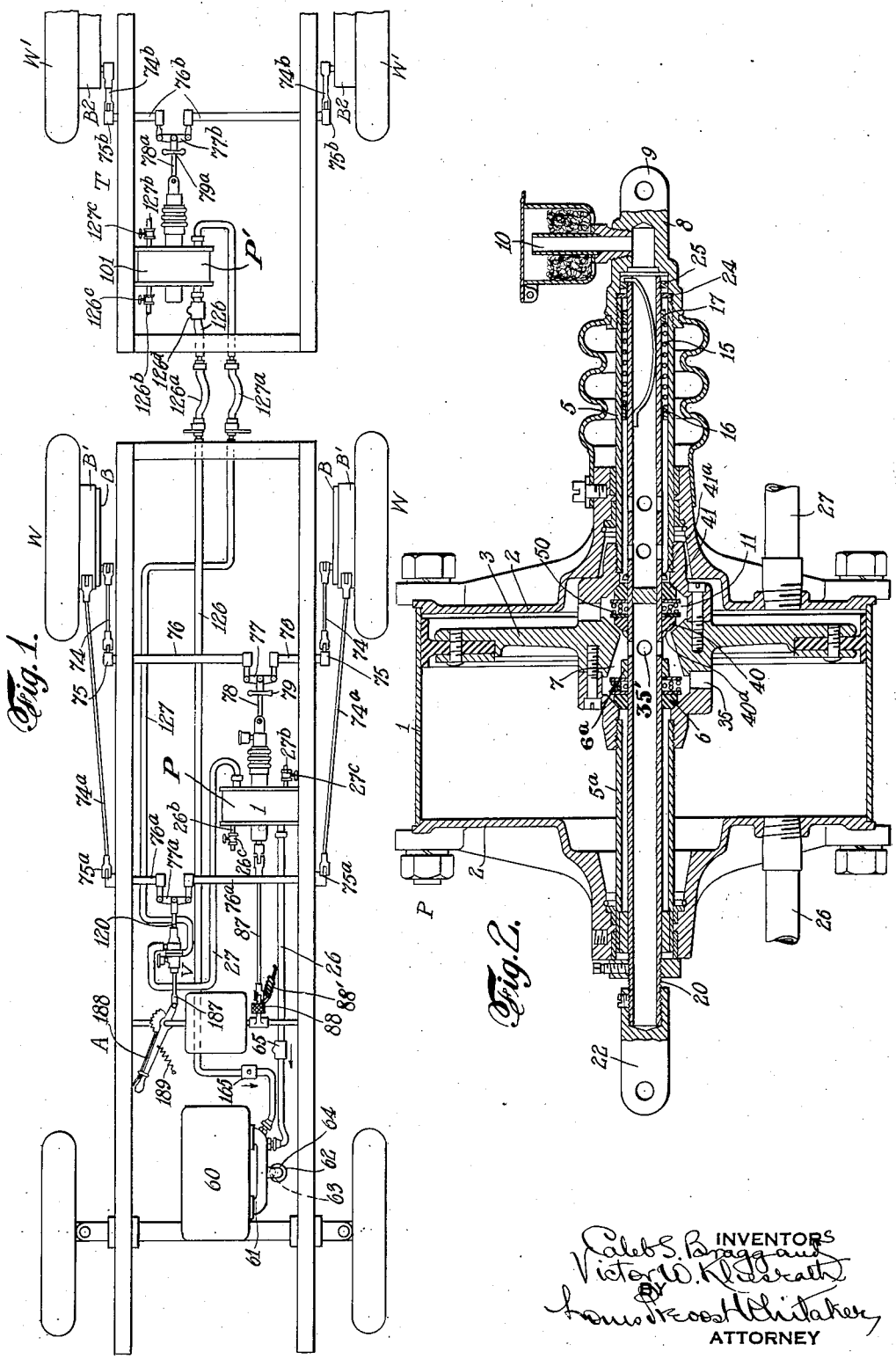

Fig. 5.

Patented Apr. 18, 1933

1,904,267

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed March 28, 1929. Serial No. 350,744.

Our invention consists in the novel features hereinafter described, reference being had to the accompanying drawings which illustrate several embodiments of the same, selected by us for purposes of illustration, and the said invention is fully disclosed in the following description and claims.

Our invention is an improvement in a vacuum brake system for automotive vehicles in which independently operable brake mechanisms are provided for certain pairs of wheels of the vehicle, or vehicles, and connected with separate power actuators operated by differentials of fluid pressures obtained preferably by a connection with the throttle controlled suction passage of an internal combustion engine which propels the vehicle or vehicles, as the source of lower pressure, and the atmosphere as the source of higher fluid pressure, under the control of suitable valve mechanism. Means are provided for applying the physical force of the operator to the brake mechanisms for certain of said pairs of wheels, either independently of or supplementing the power exerted by a power actuator thereon. Each of said power actuators is connected with the source of suction, as the intake manifold of the engine, by a separate suction pipe or passage to the end that should one of the suction pipes or the power actuator connected therewith, become broken or inoperative, so that air is admitted through the suction pipe to the intake manifold, the effect would be merely a partial reduction of the vacuum in the intake manifold, and there would remain a sufficient degree of vacuum therein to operate the other power actuator, or actuators, to apply the brake mechanisms connected therewith, even though they may be applied with less than their normal maximum power. Other brake mechanisms for the the vehicle may nevertheless be called into operation by the physical force of the operator, so that even in case of such an accident the vehicle may be slowed down or stopped, and danger of serious accidents from such breakage of a suction connection may be avoided.

Our invention also comprises certain novel features of construction and combination of parts hereinafter fully described and particularly pointed out in the claims.

Referring to the accompanying drawings which illustrate several embodiments of our invention, selected by us for purposes of illustration.

Fig. 1 is a diagrammatic plan view of a tractor vehicle and a trailer vehicle, the latter partly broken away, provided with a vacuum brake system embodying our present invention.

Fig. 2 is an enlarged sectional view illustrating the preferred construction of the actuator shown upon the tractor vehicle in Fig. 1, in which the controlling valve mechanism is shown located within the piston of the actuator.

Fig. 3 is a similar view of a different form of power actuator shown upon the trailer in Fig. 1 and adapted to be operated by exterior valve mechanism.

Fig. 4 is a detail sectional view of a form of valve mechanism shown in Fig. 1, interposed in piping connecting the said actuators in rear of the pistons therein, and constructed to permit the control of all of said actuators by the valve mechanism for the main actuator, or to independently control the auxiliary actuator, or actuators, by means of a separate physically operated part.

Fig. 5 is a diagrammatic view, somewhat similar to Fig. 1, in which all the brake mechanisms and their actuators are located upon a single vehicle.

In the accompanying drawings, Fig. 1, A illustrates a tractor vehicle, provided with a plurality of pairs of wheels, some or all of which may be provided with suitable brake mechanisms. T represents a trailer provided with its own supporting wheels, two of which are indicated in the drawings. In this instance the tractor vehicle is shown as having its rear wheels indicated at W, W, provided with two independently operable sets of brake mechanisms. A pair of internal brake mechanisms are indicated at B, operatively connected by links, 74, and arms, 75, with rock shaft sections, 76, provided with the usual equalizer, indicated at 77. A pair of exterior brake mechanisms are indicated at B', B', and are connected by links, 74a, and arms, 75a, with rock shaft sections, 76a, connected with the usual equalizer, 77a. It may be understood that one set of brake mechanisms, as the interior brake mechanisms, B, B, for example, may be more rugged or powerful in their braking action than the other set of brake mechanisms, as the exterior set of brake mechanisms, B', B', but this is not essential. The trailer wheels, indicated at W', W', which may be any pair of wheels thereof, are shown provided with brake mechanisms, indicated at B2, B2, in this case interior brake mechanisms, connected by links, 74b, and arms, 75b, with cross shaft sections, 76b, provided with the usual equalizer, 77b.

P represents a power actuator which is operatively connected with certain of the tractor brake mechanisms, in this case the more rugged or interior brake mechanisms, B, B. This power actuator may be of any desired type, but we have shown it as indicated in Fig. 2, of the type in which the controlling valve mechanism is located within the actuator piston and in which the piston is normally maintained submerged in vacuum (or lower fluid pressure) when in released position. The particular construction of this power actuator forms no part of our present invention, as substantially the same structure is covered by our former Letters Patent of the United States, No. 1,583,117, and granted May 4, 1926, and it will therefore be only briefly described. This power actuator comprises a cylinder, 1, closed at both ends by heads, 2, and is provided with a piston, 3, having in this instance hollow piston rods, 5 and 5a, extending through the opposite ends of the cylinder. The piston hub contains a valve chamber, indicated at 11, containing oppositely disposed valves, of which 40, is the suction valve, and 41, the air or higher pressure valve, said valves being mounted slidingly upon a sleeve, 20, (between collars, 40a and 41a) extending through the valve chamber, and the hollow piston rods, and projecting from one end of the cylinder beyond the adjacent piston rod, 5a. The valves, which are preferably formed of compressed material as rubber, cork, etc., are pressed toward their seats by intervening spring or springs, 50, and a spring, indicated at 15, interposed between a collar, 17, on the exterior of the sleeve, and collar, 16, on the interior of the hollow piston rod, 5, normally holds the suction valve, 40, in open position, in the released position of the parts. The piston hub is provided with a suction chamber, 7, forward of the suction valve, 40, and communicating by a passage, or passages, 35, with the cylinder forward of the piston, the forward end of the suction chamber being in this instance closed by a spring actuated valve, indicated at 6, to prevent the admission of air through the hollow piston rod, 5a, which in this instance serves merely to assist in guiding the piston. Valve 6 is urged on its seat by means of the collar 6a carried by rod 20. This valve serves the purpose of a packing gland. The admission of air or other higher fluid pressure is effected through an air inlet, 10, in a cap, 8, at the end of the piston rod, 5, which may be provided with an air strainer, as shown. The piston rod cap is shown provided with a projecting lug, 9, for connecting it by a link, 78, provided with a suitable adjusting device, 79, with the equalizer, 77, for operating the brake mechanisms, B, B. The valve actuating sleeve, 20, is provided with a suitable attaching lug, 22, which is shown connected by a link, 87, with a foot operated brake lever, 88, which may be provided with the usual retracting spring 88'.

In order to connect the suction chamber, 7, of the actuator, P, with the source of suction, we have shown a suction pipe, indicated at 26, extending from the cylinder on the forward side of the piston to the intake manifold, 61, of the internal combustion engine, (indicated at 60) which propels the vehicles. It will be understood that the internal combustion engine is provided with the usual carburetor 62, and vertical passage, 64, therefrom, to the intake manifold, and the throttle valve, 63, between the carburetor and the engine cylinders, as is customary in internal combustion engines for automotive vehicles, and that when the throttle valve is closed, or partly closed, there will exist in the intake manifold a rarification or suction, indicated by approximately twenty inches of mercury on the vacuum gauge at sea level, given the power actuator and effective force of approximately five pounds per square inch of piston area. The valve actuating sleeve, 20, moves with and with respect to the piston, and means are provided for limiting the relative movement of the parts. For example, in this instance the sleeve is shown provided with a collar, 25, adapted to engage a collar, 24, at the end of the hollow piston rod, 5, so as to enable the operator to apply his physical force to the piston and brake mechanism connected therewith when this lost motion, which is sufficient to insure the operation of the valve mechanism, is taken up.

P' indicates a second power actuator for operating another set of brake mechanisms at a distance from the controlling valve mechanism therefor, and it is in this instance located on the trailer. The actuator, P', as shown in this instance (see Fig. 3) comprises a cylinder, 101, closed at both ends by heads, 102, and provided with a piston, 103, having a hollow piston rod, 105, provided with a cap, 108, carrying the attaching lug, 109, connected in this instance by a link, 78a, and adjusting device, 79a, with the equalizer, 77b, of the trailer brake mechanisms. The cylinder, 101, is shown provided with a guiding sleeve, 105a, secured to one of the heads, 102, and having a guiding engagement with the interior of the hollow piston rod, but this is not essential.

The forward end of the cylinder, 101, is connected by a pipe, 126, having a flexible section, 126a, between the vehicles (where the actuator, P', is on the trailer) with the intake manifold, 61, independently of the suction pipe, 26, as shown in Fig. 1.

We prefer to so connect the power actuators, P and P', that they may be simultaneously operated under the control of a single valve mechanism, in this instance the valve mechanism of the power actuator, P, operatively connected with the pedal lever, 88, as previously described, and at the same time we prefer to provide a second valve mechanism connected with a different physically operated part for controlling the auxiliary actuator (on the trailer, as shown in Fig. 1), independently of the actuator, P, and we also prefer to provide means for connecting this second physically operated part with certain brake mechanism of the main vehicle, so that the physical force of the operator can be applied thereto, when desired. In this instance we have shown a second valve mechanism, illustrated at V in Fig. 1 (one form of which is shown in section in Fig. 4), for this purpose. This valve mechanism comprises a valve casing, 110, provided with a valve chamber, 111, in which are located a suction valve, 140, and an air inlet valve, 141, slidingly mounted on a rod, 120, between collars, 140a and 141a, and provided with an intermediate spring, or springs, 150, constructed and operating substantially like the valve mechanism in the hub of the piston, 3. The valve casing is provided with a suction chamber, 107, adjacent to the suction valve, having a communicating aperture, 112, and the valve casing is further provided with an air inlet chamber, 113, having an air inlet aperture, 114, which may communicate with an air strainer, as shown. Means are provided for limiting the lost motion between the valve casing, 110, and the valve actuating rod, 120, comprising in this instance a collar 128, on the rod, 120, which is adapted to engage one end of an adjustable sleeve, 129, with which the valve casing is provided. This lost motion is sufficient to permit of the operation of the valve mechanism, and when taken up will transmit the physical force of the operator directly through the valve mechanism to the brake mechanism connected therewith, as herein described. The valve chamber, 111, of the casing is also provided with an aperture, 115, which is connected by a pipe, 127, with the cylinder, 101, of the actuator, P', in rear of the piston thereof (in this instance on the trailer), said piping having a flexible portion, 127a, extending from one vehicle to the other. The suction chamber, 107, of the valve casing is connected by a pipe, 27, with the cylinder, 1, of the actuator, P, in rear of the piston thereof. The valve mechanism, V, is connected in linkage between an emergency brake lever, 188, and certain of the brake mechanisms, the lever, 188, being connected by a link, 187, with the valve casing, 110, and the valve actuating rod, 120, being connected in this instance directly with the equalizer, 77a, for operating the exterior brake mechanisms, B', B'. The emergency brake lever 188 may be provided with the usual segment and locking pawl, if desired, and with a retracting spring 189.

In the released position of the parts, the suction valve, 40, of the actuator, P, and the suction valve, 140, of the valve mechanism, V, will be normally maintained in open position. When the engine is running and the throttle valve is closed, or partly closed, the air will be exhausted from each actuator cylinder forward of the piston through the separate suction pipes, 26 and 126, as will be readily understood. On account of the open suction valve, 40, which places the portions of the cylinder, 1, on opposite sides of the piston in communication with each other, air will also be exhausted from the cylinder, 1, in rear of the piston and through pipe, 27, and through normally open suction valve, 140, which places pipe, 27, in communication with the connecting pipe, 127, air will likewise be exhausted from the cylinder, 101, in rear of the piston, so that in the normal or released position of the parts, both pistons will be maintained submerged in vacuum. We prefer to provide the suction pipes, 26 and 126, with check valves, indicated at 65 and 165, opening in a direction toward the intake manifold, 161, so that after the actuator cylinders have been evacuated, the vacuum therein will not be disturbed by subsequent changes in the degree of rarification in the intake manifold, due to the opening of the throttle valve between operations of the brake system.

If the operator depresses the pedal lever, 88, the suction valve, 40, will be closed and the air inlet valve, 41, will thereafter be opened, placing the rear end of the cylinder, 1, in communication with the atmosphere. The air will enter this cylinder and pass through pipe, 27, and pipe, 127, to the cylinder of actuator, P', in rear of the piston, building up pressure therein and effecting an almost simultaneous power stroke of the pistons, 3 and 103, and applying the brake mechanisms, B, B, of the tractor, and the brake mechanisms, B2, B2, of the trailer (in the construction shown in Fig. 1). The application of the brakes may be arrested at any desired brake pressure if the operator simply stops the forward movement of his foot, and pedal 88, as the continued forward movement of the piston, 3, will effect a follow-up, so as to close the air inlet valve, 41, without opening the suction valve, 40, and hold the brakes as applied by both power actuators, and the brakes applied by both actuators may be released by simply relieving the pressure on the pedal, 88, so as to permit of the reopening of the suction valve, 40, whereupon the air admitted to operate the brakes in both power actuators will be withdrawn through the pipes, 127, 27 and 26. The operator may also add his physical force to the brakes, B, B, of the tractor, by taking up the lost motion between collars, 25 and 24, when the brakes, B, B, have been applied, with the full force of the actuator, P. In the example given in Fig. 1, the operator may thus effect by power, the application of the stronger brake mechanisms, B, B, of the tractor and the brake mechanisms of the trailer, and may also add his physical force to the brake mechanisms, B, B, of the tractor.

If the operator operates the emergency lever, 188, without operating the pedal lever, 88, the valve casing of the valve mechanism, V, will be shifted with respect to the valve actating rod, 120, closing the suction valve, 140, and cutting off communication with the actuator, P, through pipe 27, and opening the air inlet valve, 141, thereby admitting air to pipe, 127, and to the cylinder, 101, of actuator, P', in rear of the piston, to produce a stroke thereof, and apply the trailer brakes B2, B2, by power, and by taking up the lost motion between the collar, 128 and sleeve, 129, he can, in addition thereto, apply the brakes, B', B', (the external brakes) of the tractor.

It will also be noted that if it becomes desirable to apply all the brake mechanisms and the operator has first depressed the foot lever, 88, and applied the brake mechanisms, B, B, and B2, B2, he may nevertheless, by operating the emergency lever, 188, operate the brakes, B', B', by his physical force, as the shifting of the valve mechanism, V, in taking up the lost motion provided in the linkage connected with the hand lever, 188, will in such case merely transfer the control of the actuator, P', from the valve mechanism operated by lever, 88, to the valve mechanism, V, and the physical force of the operator may be added to the brake mechanisms, B, B, through the foot lever, 88, as previously described.

Owing to the fact that the forward ends of the separate actuator cylinder or cylinders are each connected by a separate suction pipe to the intake manifold, should one of these suction pipes, or the actuator connected therewith, become broken or detached, so as to discharge air from the atmosphere into the intake manifold, and thereby produce a partial reduction of the normal vacuum or rarification, which would otherwise be present in the intake manifold when the throttle valve is closed, or partly closed (the usual position of the throttle valve when brake mechanisms are to be applied) there would yet remain a certain degree of rarification in the manifold, or suction passage, which would ordinarily be sufficient to operate the other power actuator and apply the brake mechanisms connected therewith, even though they were not applied to the full extent of the normal power of the actuator. Thus, if the pipe, 26, should become fractured and admit air to the manifold and to the actuator, P, forward of the piston, it would be impossible to apply the brakes, B, B, by power, but by operating the emergency lever, 188, the actuator, P', could be operated to apply the trailer brakes, B2, B2, and the operator could also, in the arrangement shown in Fig. 1, apply his physical force not only to the brakes, B', B', connected with the emergency lever, but also to the brakes, B, B, by taking up the lost motion between the valve actuating sleeve, 20, and the piston, 3, so that all of the brakes could be applied and the vehicle stopped or slowed down. Likewise, if the suction pipe, 126, should become broken, the actuator, P', could not be operated to apply the trailer brakes, B2, B2, but the tractor brakes, B, B, could be applied by power, supplemented by the physical force of the operator and by means of the emergency lever, the physical force of the operator could also be applied to the brakes, B', B'. Thus, the provision of separate suction pipes becomes a highly important safety factor which is augmented by the described arrangements by which the physical force of the operator may be applied to different sets of brake mechanisms, and under ordinary circumstances a sufficient amount of braking power could be brought into operation to arrest and stop the vehicle even though one of the suction pipes should be rendered inoperative.

It will be understood that the trailer may be provided with more than one actuator, if desired, connected with appropriate brake mechanisms, and in Fig. 1, for example, we have shown the cylinder, 101, provided with pipe connections, 126b, and 127b, connected thereto respectively on opposite sides of the piston, which may be connected in the same manner to an additional actuator, or actuators, (not shown). These pipes are shown in the drawings provided with cut off cocks, 126c and 127c, by which they may be closed when no other actuator cylinders are connected therewith. In like manner we have shown the cylinder, 1, of the main actuator, P, provided with pipes, 26b and 27b, having cut off cocks, 26c and 27c, by which pipes an additional actuator or actuators of the type shown in Fig. 3, on the tractor vehicle, may be connected with the cylinder 1, for substantially simultaneous operation therewith.

Figure 5:
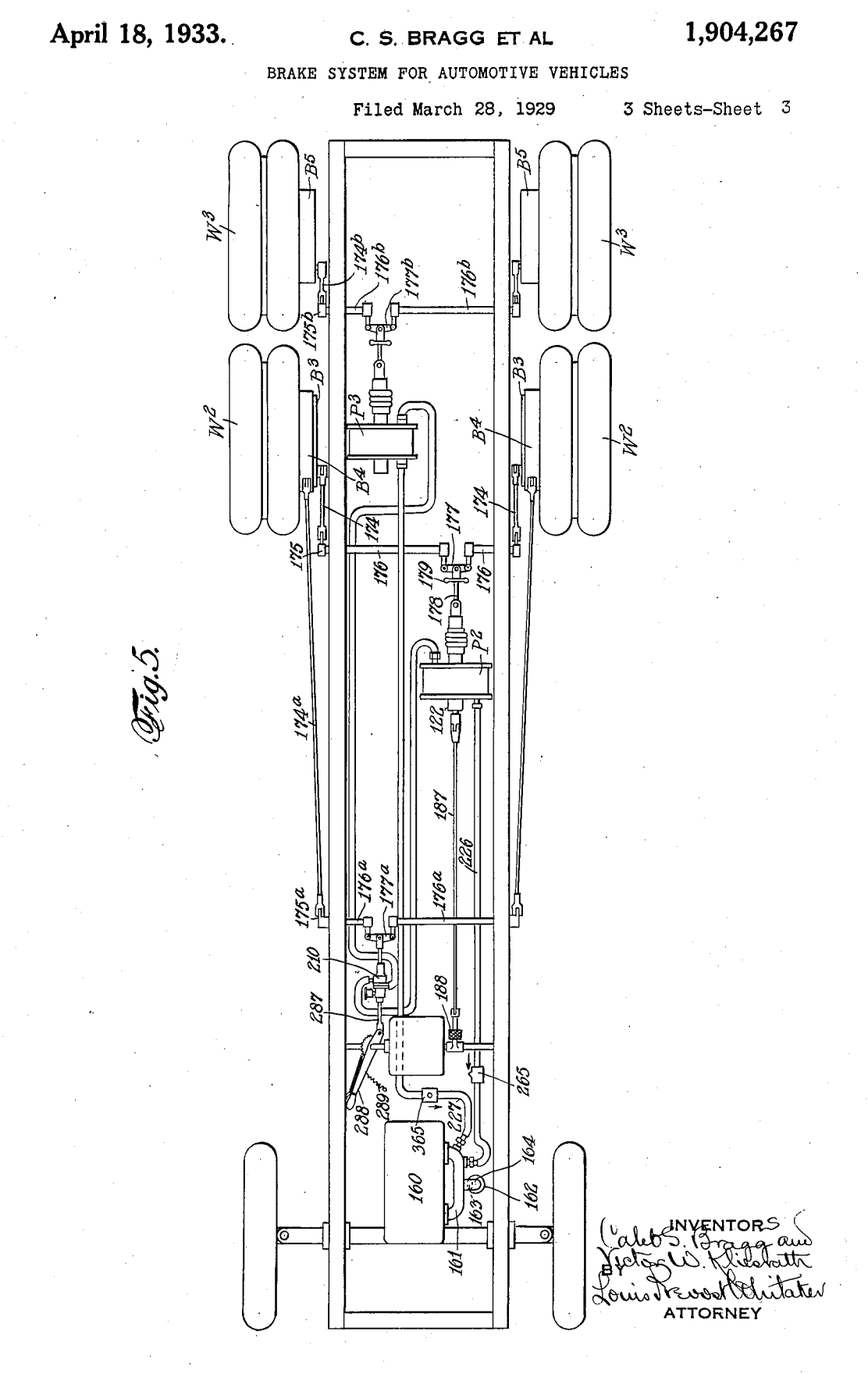

In Fig. 5 we have shown a diagrammatic view, similar to Fig. 1, illustrating substantially the same brake system as that shown in Fig. 1, except that the auxiliary power actuator, indicated at P3, is connected with brake mechanisms for wheels of the tractor instead of for the trailer, and the cylinder thereof is mounted on the tractor, the main actuator, P2, being in this instance connected with internal brake mechanisms, B3, B3, for certain wheels, W2, W2, of the tractor, which are also provided with external brake mechanisms, B4, B4, while the brake mechanisms, indicated at B5, B5, are applied to additional rear wheels, W3, W3, of the tractor, and operatively connected with the power actuator, P3. The parts in Fig. 5 which correspond with those in Fig. 1, have been given the same reference numerals, with the addition of 100, and need not be again described, as the operation will be precisely the same as previously set forth.

In Fig. 1 we have shown pipe, 126, forward of cylinder, 101 provided with a check valve, 126$^d$, opening toward the suction passage so that in case the trailer should brake away, the trailer brakes will be automatically applied.

What we claim and desire to secure by Letters Patent is:—

1. In a brake system for automotive vehicles provided with an internal combustion engine having a throttle controlled suction passage, the combination with main and at least one auxiliary power actuator, each comprising a cylinder and piston, means for connecting said pistons with brake mechanisms, a separate suction line for each cylinder for connecting it with the said suction passage, a main controlling valve mechanism for controlling the operation of said main and auxiliary actuators for joint operation, separate valve mechanism for controlling the auxiliary actuator, and independent physically operable parts for operating said valve mechanisms.

2. In a brake system for automotive vehicles provided with an internal combustion engine having a throttle controlled suction passage, the combination with main and at least one auxiliary power actuator, each comprising a cylinder and piston, means for connecting said pistons with brake mechanisms, a separate suction line for each cylinder for connecting it with the said suction passage, a main controlling valve mechanism for controlling the operation of said main and auxiliary actuators for joint operation, separate valve mechanism for controlling the auxiliary actuator, independent physically operable parts for operating said valve mechanisms, and means including a provision for lost motion for connecting each physically operable part with certain brake mechanisms.

3. In a brake system for automotive vehicles provided with an internal combustion engine having a throttle controlled suction passage, the combination with main and at least one auxiliary power actuator, each comprising a cylinder and piston, means for connecting said pistons with brake mechanisms, a separate suction line for each cylinder for connecting it with the said suction passage, a main controlling valve mechanism for controlling the operation of said main and auxiliary actuators for joint operation, separate valve mechanism for controlling the auxiliary actuator, independent physically operable parts for operating said valve mechanisms, and means including a provision for lost motion for connecting each physically operable part with different brake mechanisms, the brake mechanisms connected with at least one of said physically operable part being unconnected with any of said actuators.

4. In a brake system for automotive vehicles provided with an internal combustion engine having a throttle controlled suction passage, the combination with main and at least one auxiliary power actuator, each comprising a cylinder and piston, means for connecting said pistons with brake mechanisms, a separate suction line for each cylinder for connecting it with the said suction passage, a main controlling valve mechanism for controlling the operation of said main and auxiliary actuators for joint operation, separate valve mechanism for controlling the auxiliary actuator, independent physically operable parts for operating said valve mechanisms, means including a provision for lost motion for connecting one of said physically operable parts with the brake mechanisms operated by the actuator controlled thereby, and means including a provision for lost motion for connecting the other physically operable part with brake mechanism separate from those connected with any of said actuators.

5. In a brake system for automotive vehicles provided with an internal combustion engine, having a throttle controlled suction passage, the combination with main and auxiliary power actuators, each comprising a cylinder closed at both ends, and a piston therein provided with means for connecting it with brake mechanism, of a main valve mechanism for connecting all of said cylinders in rear of the pistons therein with said suction passage and with a source of higher fluid pressure, a physically operable part for operating said valve mechanism, an auxiliary valve mechanism for connecting the cylinder of said auxiliary actuator with said suction passage and said source of higher fluid pressure, a separate physically operable part for operating said auxiliary valve mechanism, and an independent tubular connection for connecting each actuator cylinder forward of its piston to the said suction passage.

6. In a brake system for automotive vehicles provided with an internal combustion engine, having a throttle controlled suction passage, the combination with main and auxiliary power actuators, each comprising a cylinder closed at both ends, and a piston therein provided with means for connecting it with brake mechanism, of a main valve mechanism and cooperating conduits for connecting all of said cylinders in rear of the pistons therein with said suction passage and with a source of higher fluid pressure, a physically operable part for operating said valve mechanism, an auxiliary valve mechanism and associated conduits for connecting the cylinder of said auxiliary actuator with said suction passage and said source of higher fluid pressure, a separate physically operable part for operating said auxiliary valve mechanism, an independent tubular connection for connecting each actuator cylinder forward of its piston to the said suction passage, and means including a provision for lost motion for connecting each of said physically operated parts with certain brake mechanisms.

7. In a brake system for automotive vehicles provided with an internal combustion engine, having a throttle controlled suction passage, the combination with main and auxiliary power actuators, each comprising a cylinder closed at both ends, and a piston therein provided with means for connecting it with brake mechanism, of a main valve mechanism and cooperating conduits for connecting all of said cylinders in rear of the pistons therein with said suction passage and with a source of higher fluid pressure, a physically operable part for operating said valve mechanism, an auxiliary valve mechanism and associated conduits for connecting the cylinder of said auxiliary actuator with said suction passage and said source of higher fluid pressure, a separate physically operable part for operating said auxiliary valve mechanism, an independent tubular connection for connecting each actuator cylinder forward of its piston to the said suction passage, and means including a provision for lost motion for connecting each of said physically operated parts with different brake mechanisms.

8. In a brake system for automotive vehicles provided with an internal combustion engine, having a throttle controlled suction passage, the combination with main and auxiliary power actuators, each comprising a cylinder closed at both ends, and a piston therein provided with means for connecting it with brake mechanism, of a main valve mechanism and cooperating conduits for connecting all of said cylinders in rear of the pistons therein with said suction passage and with a source of higher fluid pressure, a physically operable part for operating said valve mechanism, an auxiliary valve mechanism and associated conduits for connecting the cylinder of said auxiliary actuator with said suction passage and said source of higher fluid pressure, a separate physically operable part for operating said auxiliary valve mechanism, an independent tubular connection for connecting each actuator cylinder forward of its piston to the said suction passage, and means including a provision for lost motion for connecting each of said physically operated parts with different brake mechanisms, the brake mechanism connected with at least one of said physically operable parts being unconnected with any of said actuators.

9. In a brake system for automotive vehicles provided with an internal combustion engine, having a throttle controlled suction passage, the combination with main and auxiliary power actuators, each comprising a cylinder closed at both ends, and a piston therein provided with means for connecting it with brake mechanism, of a main valve mechanism and cooperating conduits for connecting all of said cylinders in rear of the pistons therein with said suction passage and with a source of higher fluid pressure, a physically operable part for operating said valve mechanism, an auxiliary valve mechanism and associated conduits for connecting the cylinder of said auxiliary actuator with said suction passage and said source of higher fluid pressure, a separate physically operable part for operating said auxiliary valve mechanism, an independent tubular connection for connecting each actuator cylinder forward of its piston to the said suction passage, means including a provision for lost motion for connecting the first mentioned physically operated part with the brake mechanism operated by the main actuator, and means including a provision for lost motion for connecting the second mentioned physically operated part with brake mechanism separate from those operated by any of said actuators.

10. In a brake system for automotive vehicles provided with an internal combustion engine, having a throttle controlled suction passage, the combination with main and auxiliary power actuators, each comprising a cylinder closed at both ends, and a piston therein provided with means for connecting it with brake mechanism, of a main valve mechanism and cooperating conduits for connecting all of said cylinders in rear of the pistons therein with said suction passage and with a source of higher fluid pressure, a physically operable part for operating said valve mechanism, an auxiliary valve mechanism and associated conduits interposed in the connections between the main valve mechanism and the auxiliary actuator, for independently connecting the same in rear of the piston thereof with said suction passage and with said higher fluid pressure cylinders, a separate physically operable part for operating said auxiliary valve mechanism, and an independent tubular connection for connecting each actuator cylinder forward of its piston to said suction passage independently of said valve mechanisms.

11. In a brake system for automotive vehicles provided with an internal combustion engine, having a throttle controlled suction passage, the combination with main and auxiliary power actuators, each comprising a cylinder closed at both ends, and a piston therein provided with means for connecting it with brake mechanism, a separate suction connection from each cylinder forward of its piston to said suction passage, main valve mechanism and cooperating conduits for connecting all of said cylinders in rear of the pistons thereof with said suction passage and with a higher pressure source independently of said suction connection and constructed to normally maintain said portions of said cylinder connected with said suction passage, a physically operated part for operating said valve mechanism, an auxiliary valve mechanism and associated conduits for connecting the auxiliary actuator cylinder in rear of the piston thereof with said suction passage through the main valve mechanism and with the source of higher fluid pressure independently of said valve mechanism, and constructed to normally maintain said portions of said auxiliary cylinder in communication with the suction passage, and a second physically operable part operatively connected with said auxiliary valve mechanism.

12. In a brake system for automotive vehicles provided with an internal combustion engine, having a throttle controlled suction passage, the combination with main and auxiliary power actuators, each comprising a cylinder closed at both ends, and a piston therein provided with means for connecting it with brake mechanism, a separate suction connection from each cylinder forward of its piston to said suction passage, main valve mechanism and cooperating conduits for connecting all of said cylinders in rear of the pistons thereof with said suction passage and with a higher pressure source independently of said suction connection and constructed to normally maintain said portions of said cylinder connected with said suction passage, a physically operated part for operating said valve mechanism, an auxiliary valve mechanism located in the conduit connections between said main valve mechanism and the auxiliary actuator cylinder for connecting the portions in rear of the piston thereof with the suction passage through the main valve mechanism and independently of said valve mechanism with the source of higher fluid pressure, and constructed to normally maintain said connections between the main valve mechanism and said portions of the auxiliary actuator cylinder or cylinders open, and a second physically operable part for operating said auxiliary valve mechanism.

13. In a brake system for automotive vehicles provided with an internal combustion engine, having a throttle controlled suction passage, the combination with main and auxiliary power actuators, each comprisng a cylinder closed at both ends, and a piston therein provided with means for connecting it with brake mechanism, a separate suction connection from each cylinder forward of its piston to said suction passage, main valve mechanism and cooperating conduits for connecting all of said cylinders in rear of the pistons thereof with said suction passage and with a higher pressure source independently of said suction connection and constructed to normally maintain said portions of said cylinder connected with said suction passage, a physically operated part for operating said valve mechanism, an auxiliary valve mechanism located in the conduit connections between said main valve mechanism and the auxiliary actuator cylinder for connecting the portions in rear of the piston thereof with the suction passage through the main valve mechanism and independently of said valve mechanism with the source of higher fluid pressure, and constructed to normally maintain said connections between the main valve mechanism and said portions of the auxiliary actuator cylinder or cylinders open, and a second physically operable part for operating said auxiliary valve mechanism, means including provision for lost motion for connecting each of said physically operable parts with certain brake mechanisms.

14. In a brake system for automotive vehicles provided with an internal combustion engine, having a throttle controlled suction passage, the combination with main and auxiliary power actuators, each comprisng a cylinder closed at both ends, and a piston therein provided with means for connecting it with brake mechanism, a separate suction connection from each cylinder forward of its piston to said suction passage, main valve mechanism and cooperating conduits for connecting all of said cylinders in rear of the pistons thereof with said suction passage and with a higher pressure source independently of said suction connection and constructed to normally maintain said portions of said cylinder connected with said suction passage, a physically operated part for operating said valve mechanism, an auxiliary valve mechanism located in the conduit connections between said main valve mechanism and the auxiliary actuator cylinder for connecting the portions in rear of the piston thereof with the suction passage through the main valve mechanism and independently of said valve mechanism with the source of higher fluid pressure, and constructed to normally maintain said connections between the main valve mechanism and said portions of the auxiliary actuator cylinder open, and a second physically operable part for operating said auxiliary valve mechanism, means including provision for lost motion for connecting each of said physically operable parts with certain brake mechanisms, the brake mechanisms connected with at least one of said physically operable parts being unconnected with any of said actuators.

15. In a brake system for automotive vehicles provided with an internal combustion engine, having a throttle controlled suction passage, the combination with main and auxiliary power actuators, each comprising a cylinder closed at both ends, and a piston therein provided with means for connecting it with brake mechanism, a separate suction connection from each cylinder forward of its piston to said suction passage, main valve mechanism and cooperating conduits for connecting all of said cylinders in rear of the pistons thereof with said suction passage and with a higher pressure source independently of said suction connection and constructed to normally maintain said portions of said cylinders connected with said suction passage, a physically operated part for operating said valve mechanism, an auxiliary valve mechanism located in the conduit connections between said main valve mechanism and the auxiliary actuator cylinder for connecting the portions in rear of the piston thereof with the suction passage through the main valve mechanism and independently of said valve mechanism with the source of higher fluid pressure, and constructed to normally maintain said connections between the main valve mechanism and said portions of the auxiliary actuator cylinder open, and a second physically operable part for operating said auxiliary valve mechanism, the first mentioned physically operable part being connected by means providing lost motion with the brake mechanism operated by the main actuator, and the second physically operable part being connected by means providing lost motion with separate brake mechanisms.

16. In a brake system for automotive vehicles provided with an internal combustion engine, having a throttle controlled suction passage, the combination with main and auxiliary power actuators, each comprising a cylinder closed at both ends, and a piston therein provided with means for connecting it with brake mechanism, a separate suction connection from each cylinder forward of its piston to said suction passage, main valve mechanism and cooperating conduits for connecting all of said cylinders in rear of the pistons thereof with said suction passage and with a higher pressure source independently of said suction connection and constructed to normally maintain said portions of said cylinder connected with said suction passage, a physically operated part for operating said valve mechanism, an auxiliary valve mechanism located in the conduit connections between said main valve mechanism and the auxiliary actuator cylinder for connecting the portions in rear of the piston thereof with the suction passage through the main valve mechanism and independently of said valve mechanism with the source of higher fluid pressure, and constructed to normally maintain said connections between the main valve mechanism and said portions of the auxiliary actuator cylinder open, and a second physically operable part for operating said auxiliary valve mechanism, the first mentioned physically operable part being connected by means providing lost motion with the brake mechanism operated by the main actuator, and the second physically operable part being connected by means providing lost motion with brake mechanisms unconnected with any actuator.

17. In a brake system for automotive vehicles comprising a tractor provided with an internal combustion engine, having a throttle controlled suction passage, and a trailer, the combination with a main actuator located on the tractor, and an auxiliary actuator located on the trailer, each of said actuators comprising a cylinder and a piston therein, provided with means for connecting it with brake mechanism of the vehicle on which it is located, a separate suction connection from each actuator to the suction passage of the engine, a main controlling valve mechanism and an auxiliary valve mechanism on the tractor for controlling said main and auxiliary actuators, a physically operable part for operating said main valve mechanism on the tractor, for controlling the auxiliary actuator on the trailer, a second physically operable part operatively connected with said auxiliary valve mechanism.

18. In a brake system for automotive vehicles comprising a tractor provided with an internal combustion engine, having a throttle controlled suction passage, and a trailer, the combination with a main actuator located on the tractor, and an auxiliary actuator located on the trailer, each of said actuators comprising a cylinder and a piston therein, provided with means for connecting it with brake mechanism of the vehicle on which it is located, a separate suction connection from each actuator to the suction passage of the engine, a main controlling valve mechanism and an auxiliary valve mechanism on the tractor for controlling said main and auxiliary actuators, a physically operable part for operating said main valve mechanism on the tractor, for controlling the auxiliary actuator on the trailer, a second physically operable part operatively connected with said auxiliary valve mechanism, the first mentioned physically operable part being connected by means providing lost motion with brake mechanisms for the tractor, and the said second mentioned physically operable part being connected by means providing lost motion with other brake mechanisms of the tractor.

19. In a brake system for automotive vehicles comprising a tractor provided with an internal combustion engine, having a throttle controlled suction passage, and a trailer, the combination with a main actuator located on the tractor, and an auxiliary actuator located on the trailer, each of said actuators comprising a cylinder and a piston therein, provided with means for connecting it with brake mechanism of the vehicle on which it is located, a separate suction connection from each actuator to the suction passage of the engine, a main controlling valve mechanism and an auxiliary valve mechanism on the tractor for controlling said main and auxiliary actuators, a physically operable part for operating said main valve mechanism on the tractor, for controlling the auxiliary actuator on the trailer, a second physically operable part operatively connected with said auxiliary valve mechanism, each of said physically operable parts being independently connected by means providing lost motion with brake mechanisms of the tractor, the brake mechanisms connected with at least one of said physically operable parts being unconnected with any actuator.

20. In a brake system for automotive vehicles comprising a tractor provided with an internal combustion engine, having a throttle controlled suction passage, and a trailer, the combination with a main actuator located on the tractor, and an auxiliary actuator located on the trailer, each of said actuators comprising a cylinder and a piston therein, provided with means for connecting it with brake mechanism of the vehicle on which it is located, a separate suction connection from each actuator to the suction passage of the engine, a main controlling valve mechanism and an auxiliary valve mechanism on the tractor for controlling said main and auxiliary actuators, a physically operable part for operating said main valve mechanism on the tractor, for controlling the auxiliary actuator on the trailer, a second physically operable part operatively connected with said auxiliary valve mechanism, one of said physically operable parts being connected by means providing lost motion with the tractor brake mechanisms connected with the main actuator, and the other physically operable part being connected by means providing lost motion with brake mechanisms for the tractor unconnected with any actuator.

21. In a brake system for automotive vehicles provided with an internal combustion engine, having a throttle controlled suction passage, the combination with a main actuator comprising a cylinder closed at both ends, and a piston, of a suction connection from said cylinder forward of the piston to said suction passage, valve mechanism and cooperating conduits for connecting said cylinder in rear of said piston with the suction passage and with a higher pressure source, and constructed to normally maintain said piston submerged in vacuum, brake mechanism connected to said piston, a physically operated part for operating said valve mechanism connected by means providing lost motion with said brake mechanism, a second power actuator comprising a cylinder closed at both ends and a piston therein, an independent suction connection from said cylinder forward of its piston to said suction passage, a second valve mechanism and associated conduits for connecting said second cylinder in rear of its piston with the higher pressure source and with the first mentioned actuator in rear of its piston, and constructed to normally maintain the portions of said cylinders in rear of their pistons connected, separate brake mechanisms connected with the piston of the second actuator, and a second physically operated part connected with said second valve mechanism, and operatively connected by means providing lost motion with different brake mechanisms from those to which the actuator pistons are connected.

22. In a brake system for automotive vehicles comprising a tractor provided with an internal combustion engine having a throttle controlled passage, and a trailer vehicle, the combination with a main actuator on the tractor, and an auxiliary actuator on the trailer, each comprising a cylinder closed at both ends, and a piston, provided with means for connecting it with brake mechanism for the vehicle on which the actuator is mounted, an independent suction connection from each cylinder forward of the piston therein, to said suction passage, main valve mechanism and associated conduits on the tractor for connecting each cylinder in rear of its piston with the suction passage and with a source of higher fluid pressure, an auxiliary valve mechanism located in conduit connections between the main valve mechanism and the auxiliary actuator cylinder in rear of its piston for connecting it with the suction passage and with the source of higher fluid pressure, said valve mechanisms being constructed to normally maintain the said portions of the main and auxiliary actuators in rear of their pistons connected with said suction passage and the pistons of said actuators submerged in vacuum, and independent physically operable parts for operating said valve mechanisms.

23. In a brake system for automotive vehicles comprising a tractor provided with an internal combustion engine having a throttle controlled passage, and a trailer vehicle, the combination with a main actuator on the tractor, and an auxiliary actuator on the trailer, each comprising a cylinder closed at both ends, and a piston provided with means for connecting it with brake mechanism for the vehicle on which the actuator is mounted, an independent suction connection from each cylinder forward of the piston therein to said suction passage, main valve mechanism and associated conduits on the tractor for connecting each cylinder in rear of its piston with the suction passage and with a source of higher fluid pressure, an auxiliary valve mechanism located in conduit connections between the main valve mechanism and the auxiliary actuator cylinder in rear of its piston for connecting it with the suction passage and with the source of higher fluid pressure, said valve mechanisms being constructed to normally maintain the said portions of the main and auxiliary actuators in rear of their pistons connected with said suction passage and the pistons of said actuator submerged in vacuum, and independent physically operable parts for operating said valve mechanisms, each of said physically operable parts being connected by means providing lost motion with separate brake mechanisms of the tractor.

24. In a brake system for automotive vehicles comprising a tractor provided with an internal combustion engine having a throttle controlled passage, and a trailer vehicle, the combination with a main actuator on the tractor, and an auxiliary actuator on the trailer, each comprising a cylinder closed at both ends, and a piston provided with means for connecting it with brake mechanism for the vehicle on which the actuator is mounted, an independent suction connection from each cylinder forward of the piston therein to said suction passage, main valve mechanism and associated conduits on the tractor for connecting each cylinder in rear of its piston with the suction passage and with a source of higher fluid pressure, an auxiliary valve mechanism located in conduit connections between the main valve mechanism and the auxiliary actuator cylinder in rear of its piston for connecting it with the suction passage and with the source of higher fluid pressure, said valve mechanisms being constructed to normally maintain the said portions of the main and auxiliary actuators in rear of their pistons connected with said suction passage and the pistons of said actuator submerged in vacuum, and independent physically operable parts for operating said valve mechanisms, one of said physically operable parts being connected by means providing lost motion with brake mechanisms operated by the main actuator, and the other physically operated part being connected by means providing lost motion with other brake mechanisms of the tractor.

In testimony whereof we affix our signatures.

CALEB S. BRAGG.
VICTOR W. KLIESRATH.